United States Patent [19]

Gilmore

[11] Patent Number: 5,248,928

[45] Date of Patent: Sep. 28, 1993

[54] TIMED BATTERY CHARGER

[75] Inventor: Alan A. Gilmore, Baltimore, Md.

[73] Assignee: Black & Decker Inc., Newark, Del.

[21] Appl. No.: 853,842

[22] Filed: Mar. 19, 1992

Related U.S. Application Data

[63] Continuation of Ser. No. 584,215, Sep. 18, 1990, abandoned.

[51] Int. Cl.$^5$ .......................... H02J 7/04; H02J 7/10; H01M 10/44
[52] U.S. Cl. ........................................ 320/37; 320/21
[58] Field of Search .................. 320/37, 38, 2, 27, 22, 320/23, 24, 21

[56] References Cited

U.S. PATENT DOCUMENTS

| | | | |
|---|---|---|---|
| 3,252,070 | 5/1966 | Medlar et al. | 320/21 |
| 3,614,583 | 10/1971 | Burkett | 320/5 |
| 3,887,858 | 6/1975 | Burkett et al. | 320/31 |
| 4,061,956 | 12/1977 | Brown et al. | 320/22 |
| 4,237,411 | 12/1980 | Kothe et al. | 320/21 |
| 4,374,355 | 2/1983 | Steigerwald et al. | 320/43 |
| 4,394,611 | 7/1983 | Fallon et al. | 320/21 |
| 4,456,097 | 6/1984 | Salihi | 187/29 R |
| 4,476,425 | 10/1984 | Chernotsky et al. | 320/39 |
| 4,554,500 | 11/1985 | Sokira | 320/31 |
| 4,641,078 | 2/1987 | Short | 320/22 |
| 4,670,703 | 6/1987 | Williams | 320/22 |
| 4,710,694 | 12/1987 | Sutphin et al. | 320/21 |
| 4,736,150 | 4/1988 | Wagner | 320/21 |

FOREIGN PATENT DOCUMENTS 1496982  1/1978  United Kingdom .

OTHER PUBLICATIONS

Terman, Frederick, *Electronic and Radio Engineering*, p. 967, Pub Date 1955.
Vinal, George, *Storage Batteries*, 4th Ed., John Wiley & Sons 1955, pp. 250–252.

Primary Examiner—Steven L. Stephan
Assistant Examiner—E. To
Attorney, Agent, or Firm—J. Bruce Hoofnagle

[57] ABSTRACT

A charger 10 includes facility, such as a capacitor 14, for establishing a constant current source which is rectified by rectifier 16 to provide a supply of charging current at a single level in each of two successive periods of a charging cycle. The output of rectifier 16 is coupled through a SCR 26 to a battery B to be charged. Under control of a timer 28, SCR 26 remains conductive for a prescribed continuous period to facilitate the supply of the single-level charging current to battery B during a full charge or first period mode at a 100% duty cycle. At the end of the prescribed first period, a timer 36 then controls the on-off operation of SCR 26 to facilitate the supply of the single-level charging current during a trickle charge mode at a 20% duty cycle. In an alternative embodiment, a charge 100 includes four timers 118, 120, 122 and 124 which provide for three phases or modes of operation in which a single-level charging current is supplied to battery B at a duty cycle of 75% during a first of the three periods, at a duty cycle of 100% during a second of the three periods and at a duty cycle of 12.5% during a third of the three periods.

17 Claims, 4 Drawing Sheets

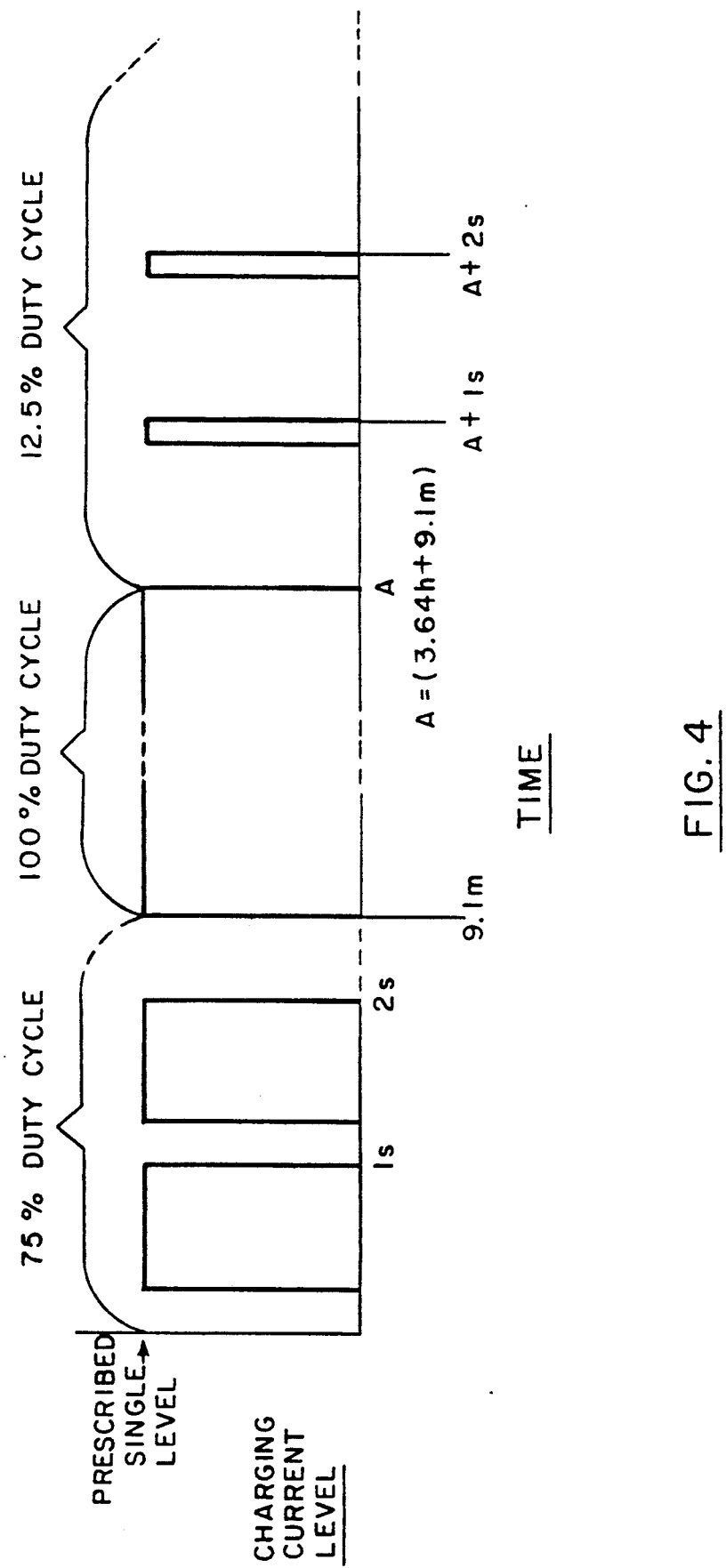

TIMED BATTERY CHARGER

This is a continuation of application Ser. No. 07/584,215 filed Sep. 18, 1990 now abandoned.

BACKGROUND OF THE INVENTION

This invention relates to a timed battery charger and particularly relates to a timer control system which operates in duty cycle modes for controlling the charging of a battery.

In known systems for charging a nickel cadmium battery, current at a first level is supplied continuously to the battery for a prescribed period to effect a full charge of the battery. Thereafter, current at a second or trickle level, lower than the first level, is supplied to the battery for a prescribed period or until the battery is removed or disconnected from the charging facility. In other systems, an additional precharge level of current, which typically falls between the above-mentioned first and second rates, is supplied to the battery to raise the voltage level thereof in preparation for acceptance of the charging current at the first level.

In a few instances, some of the various phases of charging operations at different rates of charging current are further controlled by operating at selected duty cycles. This selectively controls the amount of current supplied at a particular level of current for the above-described multiple level systems.

In systems of the types described above, complex and expensive circuit designs are necessitated to provide the current supply sources for supplying the various rates required to process through a complete charging cycle. Further, multiple interfacing circuits are required between timer control facilities of such chargers, duty-cycle control facilities and the several current supply sources necessary in providing charging current at the plurality of rates.

Systems which include some of the above-noted features are described in U.S. Pat. No. 4,394,611 which issued on Jul. 19, 1983, U.S. Pat. No. 4,554,500 which issued on Nov. 9, 1985 and U.S. Pat. No. 4,670,703 which issued on Jun. 2, 1987.

Each of the systems shown n the above-noted patents utilizes the multiple-level charging current approach. This arrangement requires additional circuit facilities to provide the charging current at different rates with complex and expanded interfacing circuits necessary for the timing and duty-cycle control where utilized. With complex and expanded circuits required, the cost of such charging systems is high and the operational energy requirement is high and costly because of the number and type of components used in such systems.

Therefore, there is a need for a charger which is not complex in construction and is inexpensive to operate but which will provide the advantages obtainable when operating in a timed, duty-cycle manner.

SUMMARY OF THE INVENTION

It is an object of this invention to provide a timed battery charger which is not complex and is inexpensive and economical to operate in the charging of a battery.

It is another object of this invention to provide a timed battery charger that can be operated in a safe and efficient manner in the charging of a battery.

With these and other objects in mind, this invention contemplates a timed battery charger for processing a battery through a charging cycle which includes means for supplying charging current at a single predetermined level to the battery to be charged and means for dividing the charging cycle into a plurality of timed phases during each of which the charging current at the single predetermined level is supplied to the battery. The charger further includes means for establishing a duty cycle of operation for each of the plurality of timed phases and means for controlling the supply of charging current at the single predetermined level in accordance with the duty cycle of operation for each of the plurality of timed phases.

BRIEF DESCRIPTION OF THE DRAWINGS

FIG. 4 is a graph showing the process of charging a battery at a prescribed single current level and at selective duty cycles with respect to the timed battery charger of FIG. 2.

DETAILED DESCRIPTION OF THE PREFERRED EMBODIMENT

Figure 1:
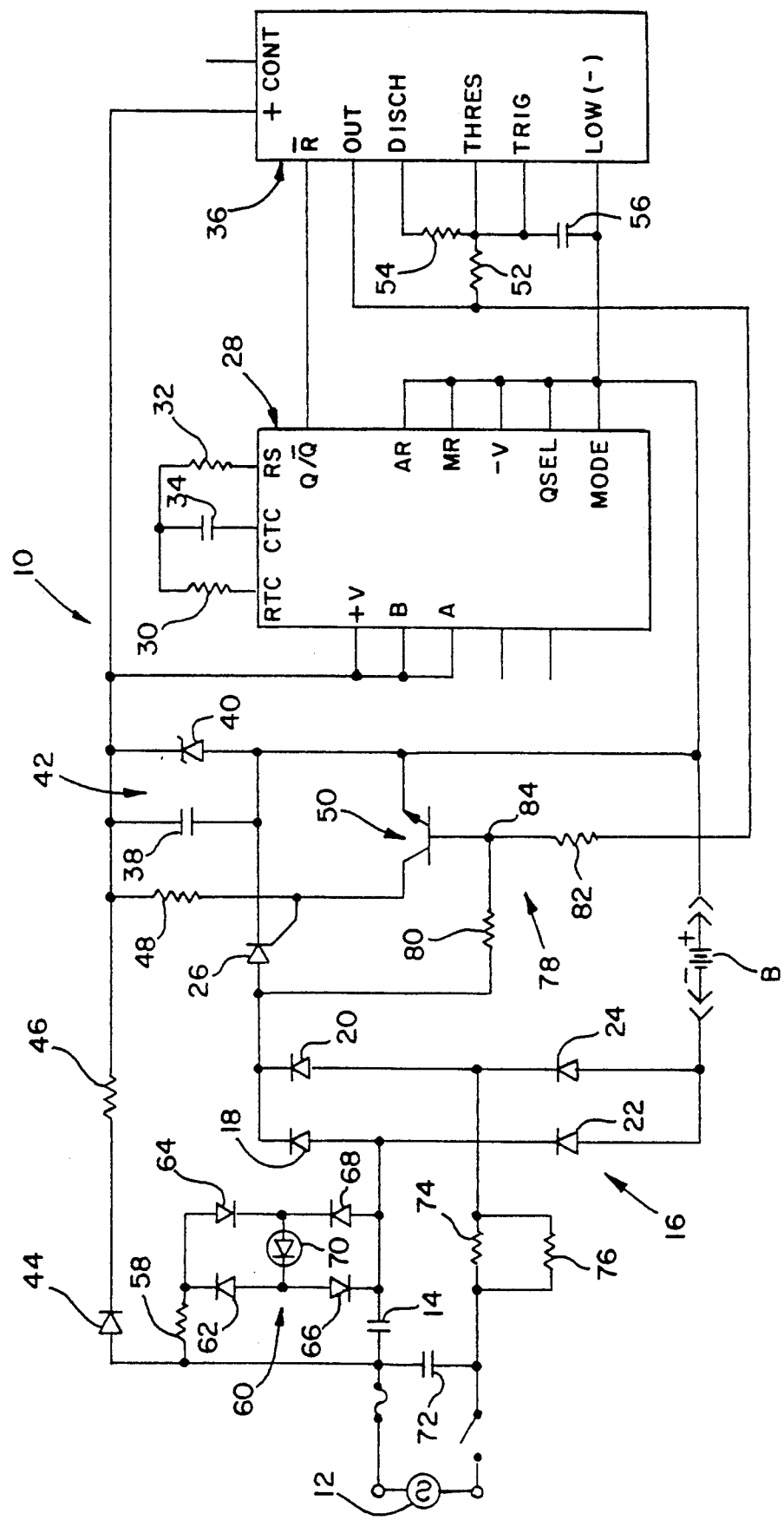
FIG. 1 is a schematic illustrating a first embodiment of a timed battery charger operating on a duty-cycle premise in accordance with certain principles of the invention.

In the preferred embodiment of the invention, a two-hour capacitive charger 10 is illustrated in FIG. 1 and operates on a controlled duty-cycle premise. Charger 10 is connected to an AC input power source 12, whereby input current from the power source flows through a capacitor 14 to establish a constant current source for charging a battery B. The charging current is fed from capacitor 14 and through a full wave rectifier 16 which includes diodes 18, 20, 22 and 24 to supply a single predetermined level charging current to a charging circuit which includes a silicon controlled rectifier (SCR) 26 and battery B. In this manner, the charging of battery B is effected.

Initially, a timer 28, such as a Motorola Model No. MC14541B, controls the operation of SCR 26 to provide for full charging, at a 100 percent duty-cycle, of battery B for approximately two hours as established by a pair of resistors 30 and 32 and a capacitor 34. Thereafter, a "555" timer 36 controls the operation of SCR 26 to provide for a 20 percent duty-cycle trickle charging of battery B until the battery is removed from the charger 10 or the power source 12 is disconnected.

Note that full-charge current as well as trickle charge current are derived through a single capacitor, i.e. capacitor 14, at a single constant current level, and that SCR 26 is controlled to establish the duty cycle of operation in the full and trickle charge modes. Thus, the single predetermined level charging current is developed in this manner.

A capacitor 38 and a Zener diode 40 form a 12-volt power source 42 for timers 28 and 36. The 12-volt power source 42 derives its energy from one-half cycle of each full cycle of the AC input power source 12 through a diode 44 and a resistor 46 with a return path through battery B and diode 24. Therefore, the 12-volt power source 42 will not pull up unless battery B has been connected in the charger 10. During the other one-half cycle, diode 44 prevents capacitor 38 from discharging.

When battery B and the AC input power source 12 are both connected to the charger 10, the 12-volt power source 42 pulls up and timer 28 begins a two hour count. At the same time, current flows through a gate resistor 48 to the gate electrode of SCR 26 whereby the SCR fires to complete the path for full charging current. Also, during the two-hour period, the Q/$\overline{Q}$ output of timer 28 is low and is coupled to the $\overline{R}$ input of timer 36 whereby the OUT output of timer 36 is also low. This low is coupled to the base of a transistor 50 and the normally low output of timer 36 is coupled to the emitter of the transistor. Since both the emitter and base of transistor 50 are low, the transistor is in the nonconductive state during the two-hour period.

Upon completion of the two-hour charge mode, the Q/$\overline{Q}$ output of timer 28 reverses state whereby the OUT output of timer 36 goes high. The base of transistor 50 now goes high whereby the transistor is turned on. With transistor 50 now conducting, the collector-emitter circuit of the transistor provides a bypass path for the gate current of SCR 26 whereby the SCR is turned off.

Through timing control of timer 36 as established by a pair of resistors 52 and 54 and a capacitor 56, the OUT output of the timer remains high for 0.8 second during which time transistor 50 is on and SCR 26 is not conducting as described above thereby preventing the supply of charging current to battery B. After 0.8 second, the OUT output of timer 36 goes low and transistor 50 is turned off. With transistor 50 turned off, SCR 26 is again fired whereby the single predetermined level charging current from rectifier 16 is supplied to battery B. After 0.2 second, the OUT output of timer 36 again goes high whereby transistor 50 is turned on to turn off SCR 26. As SCR 26 is turned off, charging current ceases to flow through battery B. This pattern is repeated each second (i.e., 0.8 second of no charging current and 0.2 second of charging current supplied to battery B) until either the battery or the AC power source 12 is disconnected from the charger 10.

Therefore, the single predetermined level charging current is supplied to battery B for 0.2 second of each full second of operation for a 20 percent duty cycle operation during the trickle charge mode.

It is noted that, while the period of the trickle charge mode is determinable by removal of battery B from the charger 10 or by disconnection of the AC input power source 12 from the charger, timer 28 is functional to initiate the trickle charge mode. Thus, timer 28 is a means for dividing the complete charging cycle into two modes, i.e. full charge mode and trickle charge mode.

In addition to establishing the constant current level, capacitor 14 functions as a power source for a circuit which includes a resistor 58 and a full wave rectifier 60 composed of diodes 62, 64, 66 and 68. When the charger 10 is in the full charge mode, current flows through resistor 58 and selected diode paths of rectifier 60 depending on the polarity of the AC input power source 12. In any event, current flows continuously through a red LED 70 to illuminate the LED as an indication that the charger 10 is in the full charge mode at a 100 percent duty cycle. During the period when the charger 10 is in the trickle charge mode, charging current flows for 0.2 second of each second for a 20 percent duty cycle. LED 70 will flicker at the same rate (i.e., on for 0.2 second of each second) to indicate that the charger 10 is in the trickle mode.

The circuit of resistor 58 and diodes 62, 64, 66 and 68 also provides a discharge path for capacitor 14 in the event that the AC input power source 12 is disconnected at a time when the capacitor is charged.

A capacitor 72 filters any EMI current which may occur at those times in a charging cycle when the voltage of battery B is typically greater than the voltage of the AC input power source 12. This usually occurs when the alternating waveform is near and at the zero crossover.

It is known that a SCR may fire momentarily when first connected in a circuit even though it is biased off. Therefore, when battery B is connected to the charger 10 and the AC input power source 12 has been connected, SCR 26 fires momentarily and, with capacitor 14 in the circuit, an undesirable spike of current with potential deleterious effects may occur. A pair of resistors 74 and 76 are included in the circuit with SCR 26 and capacitor 14 to provide a resistance-based voltage drop during this period and permits the capacitor to charge slowly thereby preventing the occurrence of an undesirable spike.

During the trickle charge mode, SCR 26 is off for a selected period as noted above whereby no current flows in the charging circuit 10. Therefore, the varying level of the alternating input appears across SCR 26. When timer 36 operates to turn off transistor 50 and to fire SCR 26, the voltage appearing across the SCR at that instant appears immediately across capacitor 14. If the AC input power source 12 is 240 volts for example, the peak voltage across SCR 26 is about 340 volts. Thus, the sudden application of 340 volts to capacitor 14 at the instant that SCR 26 fires would result in a large potentially-damaging spike.

To prevent this spike from occurring, a voltage divider 78 formed by a pair of resistors 80 and 82 is connected across SCR 26 through the OUT output and the low output of timer 36. The base of transistor 50 is connected to a mid-node 84 of the divider.

The base of transistor 50 normally requires the application of 0.65 volt to turn on the transistor. If the voltage appearing across SCR 26 at any instant is greater than approximately 11.48 volts, the voltage divider 78 provides sufficient voltage to turn on transistor 50 and thereby prevents SCR 26 from firing. Therefore, if the voltage across SCR 26 is high (i.e. 11.48 volts to 340 volts) at the time timer 36 would normally start a prescribed 0.2 second period of trickle charge current, transistor 50 is turned on as noted above to prevent SCR 26 from firing and to prevent the large voltage across the SCR from shifting instantaneously to capacitor 14. Thus, the deleterious effects are avoided. When the pulsating voltage first drops below 11.48 volts, the voltage across the nonconducting SCR 26 also drops below 11.48 volts and transistor 50 is turned off. Through control of timer 36, SCR 26 is now fired and the relatively low voltage (i.e. below 11.48 volts) shifts to capacitor 14 but is sufficiently low to avoid any significant spike. Thereafter, transistor 50 remains on for the duration of the prescribed 0.2 second period to facilitate application of the trickle charge current.

Figure 3:
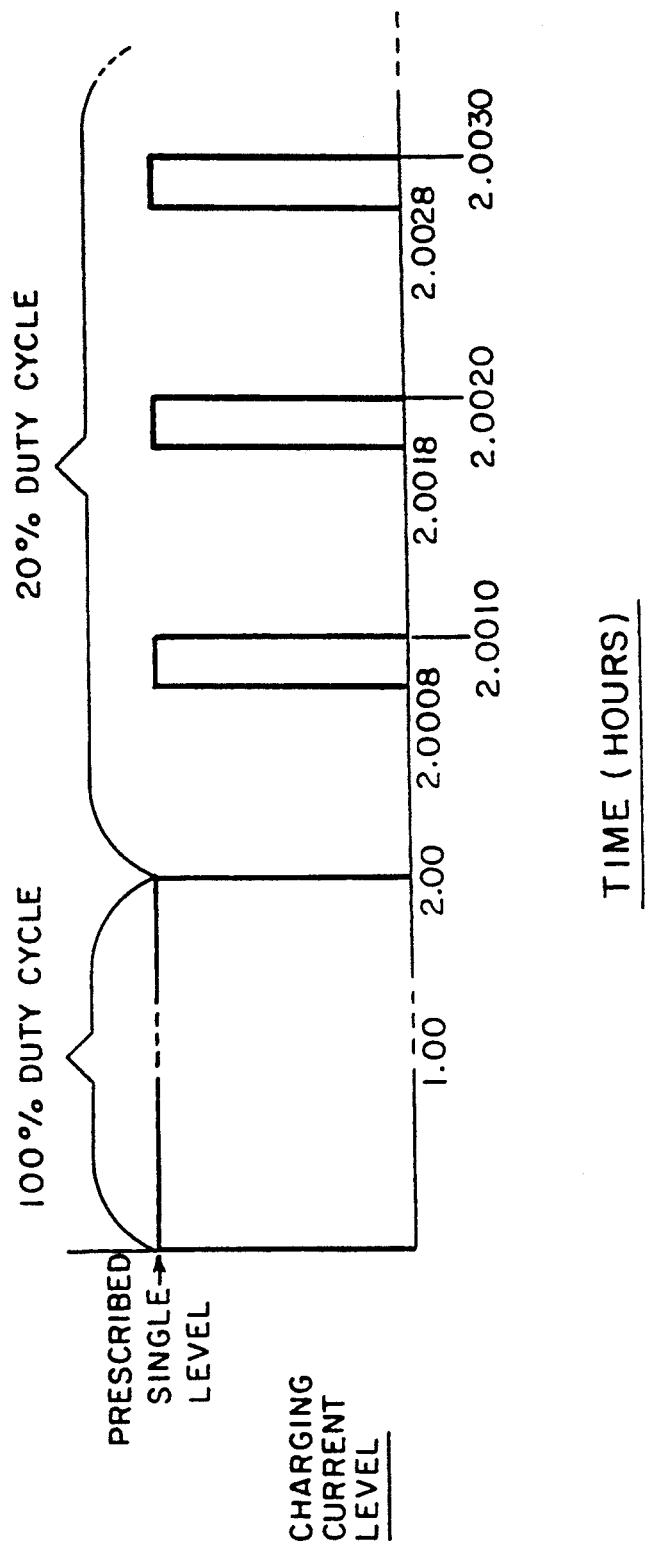
FIG. 3 is a graph showing the process of charging a battery a prescribed single current level and at selective duty cycles with respect to the timed battery charger of FIG. 1.

The graph of FIG. 3 illustrates that a single level of current is used to charge battery B and that, for the first two hours, the single level of current is supplied at a 100% duty cycle. Thereafter, as illustrated in the graph, the single level of current is supplied at a 20% duty cycle.

Figure 2:
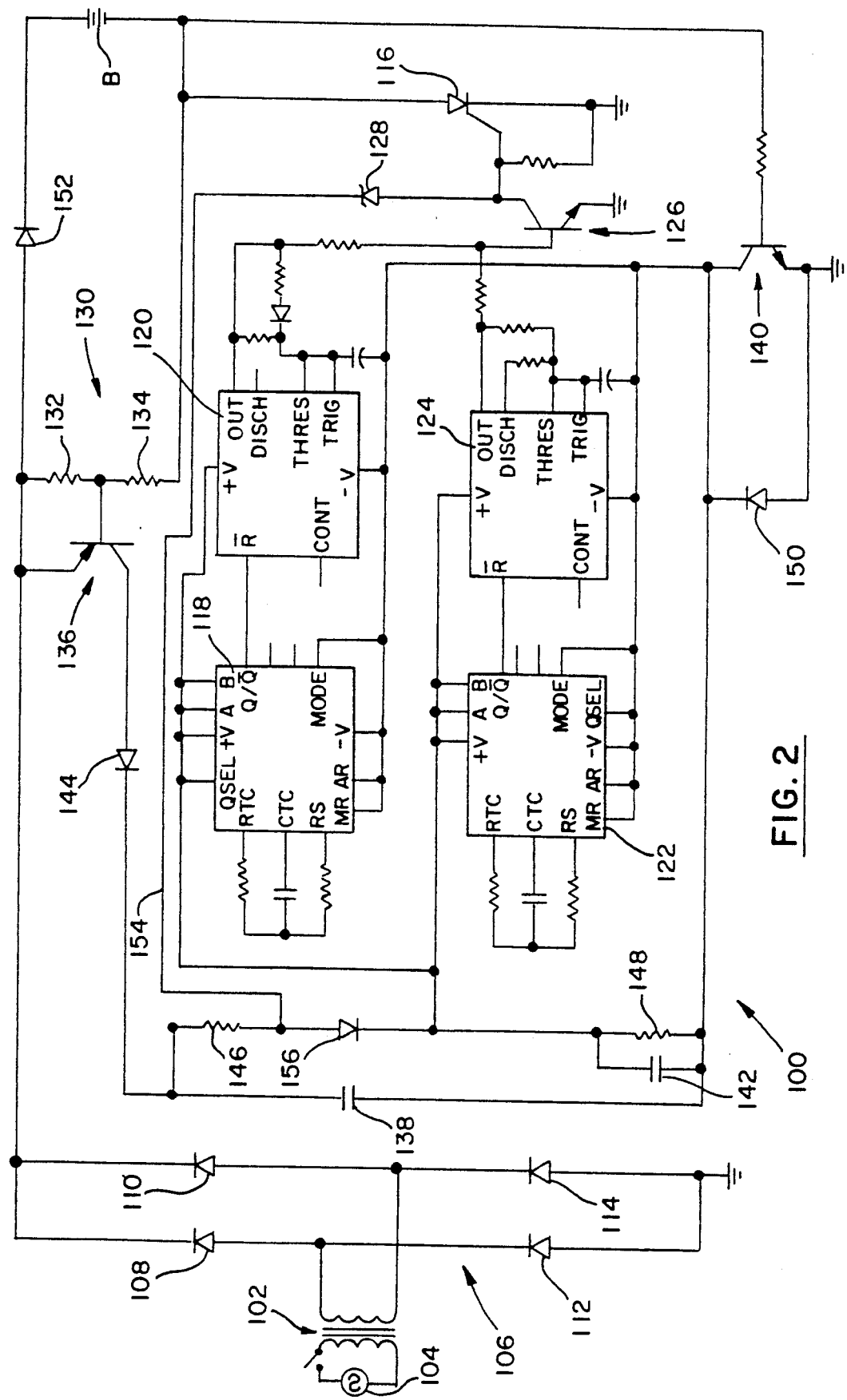
FIG. 2 is a schematic illustrating a second embodiment of a timed battery charger operating on a duty-cycle premise in accordance with certain principles of the invention.

In an alternate embodiment and as illustrated in FIG. 2, a three-stage battery charger 100 includes a transformer 102 which couples an AC input power source 104 to a full wave rectifier 106 formed by diodes 108, 110, 112 and 114 thereby forming a current source which supplies a single predetermined level charging current. During each of the three stages of battery charging, pulsating charging current is fed from the rectifier 106, through a battery B to be charged and through the anode/cathode electrodes of a SCR 116.

A plurality of timers 118, 120, 122 and 124 are arranged to control the operation of a transistor 126 which, in turn, facilitates control of SCR 116 to selectively control the duty cycle of single predetermined level charging current being supplied to battery B during each of three successive stages of operation. Initially, timer 118, which could be a Motorola Model No. MC14541B, is controlled to operate for approximately 9.1 minutes during which timer 120, which could be a "555" timer, alternately biases transistor 126 on and off at a prescribed rate. When transistor 126 is on, the gate of SCR 116 is low (or grounded) Whereby the SCR is off. When transistor 126 is off, current flows through a Zener diode 128 (assuming other conditions are met as described below) and into the gate electrode of SCR 116 whereby the SCR fires. Based on the prescribed rate of turning transistor 126 on and off, charger 100 will operate to supply the single predetermined level charging current at a 75% duty cycle.

In the event that the battery voltage is initially too low to be receptive to a full charge mode, the supply of the single-level charging current for 9.1 minutes at a 75% duty cycle is typically sufficient to raise the battery voltage to a battery-charge receptive level.

Timer 122, which also could be a Motorola Model No. MC14541B, is also started simultaneously with the starting of timer 118 and disables timer 124, which could be a "555" timer, from feeding a biasing signal to transistor 126. When timer 118 times out at 9.1 minutes, timer 122 continues to count for approximately three more hours. Specifically, the desired period would be 3.64 hours after timer 118 has timed out. During the period when timer 122 is counting, and timer 124 is disabled, transistor 126 is off and current flows through Zener diode 128 to fire SCR 116. Consequently, SCR 116 will remain on for the period of operation of timer 122 following the time out of timer 118. In this manner, full charge current, in the form of pulsations from rectifier 106, is fed in uninterrupted fashion to battery B. Thus, the charger 100 operates to supply the single predetermined level charging current at a 100% duty cycle during the second or full charge level for 3.64 hours.

Thereafter, timer 122 times out whereby timer 124 is biased to control the operation of transistor 126 at such a rate that SCR 116 operates to supply trickle charging current to battery B at a duty cycle of 12.5%. The single-level charging current at this duty cycle continues until battery B is disconnected or the AC input power source 104 is disconnected.

Thus, the charger 100 provides three prescribed periods of operation with different duty cycles and timed intervals in each level, i.e., 9.1 minutes at 75% duty cycle, then 3.64 hours at 100% duty cycle and finally at a 12.5% duty cycle until the battery B or the AC input power source 104 is disconnected.

It is noted that, while the period of the final charge mode at the duty cycle of 12.5% is determined by removal of battery B from the charger 100 or by disconnection of the AC input power source 104 from the charger, timer 122 is functional to initiate the trickle charge mode. Thus, timer 122 in conjunction with timer 118 is a means for dividing the complete charging cycle into three modes, i.e. pre-full charge mode, full charge mode and trickle charge mode.

It is also noted that the charger 100 contains a single charging current source through rectifier 106 which provides charging current at the single predetermined level for all three periods of operation. Timers 118, 120, 122 and 124 then facilitate the establishment of the period of the first prescribed periods of operation and the initiation of the third level as well as the duty cycle of operation for each level.

In general operation of the charger 100, with the AC input power source 104 connected to transformer 102, battery B is inserted into the charger with the voltage of the battery being applied across a voltage divider 130 formed by resistors 132 and 134. If the battery voltage is greater than 3.3 volts, sufficient voltage is dropped across resistor 132 to bias a transistor 136 on and thereby connect the pulsating output of the rectifier 106 to a power capacitor 138. Also, when battery B is connected to the charger 100, a transistor 140 is turned on whereby ground is connected to the low side of timers 118, 120, 122 and 124 and to capacitor 138. Capacitor 138 is then charged to provide the power source for operating timers 118, 120, 122 and 124 in the manner described above.

If the voltage of battery B is initially below 3.3 volts, transistor 136 will not turn on. This prevents the charger 100 from operating and drawing a large current through the charging path of battery B which could overheat and damage the diodes in the charging path and SCR 126.

A capacitor 142 is a filter which smooths any ripples resulting from start-up glitches in timers 118, 120, 122 and 124.

If the input voltage from capacitor 138 to timers 118, 120, 122 and 124 is below eleven volts, Zener diode 128 will not break down. Even so, timers 118, 120, 122 and 124 may function at this lower applied voltage in such an indefinite manner that, if battery B is in place, the charger 100 could operate for a period longer than the prescribed times which could result in damage to the battery, particularly if this occurred during the 100% duty-cycle stage. However, since the voltage across Zener diode 128 is insufficient to break down the Zener diode, SCR 116 will not fire and the charger 100 will not enter a charge mode. Thus, battery B is protected by the manner in which Zener diode 128 is connected in the circuit.

At various times during the charging cycle, the voltage of battery B will exceed the level of the voltage being applied to the battery from the rectifier 106. For example, in a 60 Hertz line voltage system, there will be 120 DC pulses per minute at the output of the rectifier 106 which are applied to battery B at the different duty cycles noted above. During the lower portions of each pulse, the voltage level thereof is usually below the voltage level of battery B whereby current ceases to flow through the battery whereby transistor 140 is turned off. These periods are hereinafter referred to as power-down occurrences. At this time, capacitor 138 would attempt to discharge through battery B. However, a diode 144 prevents capacitor 138 from discharging through battery B during these power-down occurrences and the capacitor slowly begins to discharge through resistors 146 and 148.

Also, during the power-down occurrences, it is most important that timers 118, 120, 122 and 124 continue to operate in the prescribed manner and that Zener diode 128 remain clamped in the conducting condition. This is accomplished by the connection of a diode 150 as illustrated in FIG. 2. A first discharge path for capacitor 138 during the power-down occurrences is through resistor 146, filter capacitor 142 and resistor 148 whereby sufficient power is provided to continue the operation of timers 118, 120, 122 and 124. A second discharge path is through resistor 146, Zener diode 128, either transistor 126 or SCR 116, through ground, diode 150 and to capacitor 138. In this manner, Zener diode 128 remains conducting and precludes the possible development of harmful high voltages at the input of timers 118, 120, 122 and 124 which could have occurred when transistor 140 ceases to conduct during the power-down occurrences.

In the event line voltage fails during a period when the battery B is connected in the charger 100, a diode 152 prevents the battery B from draining into the circuit which includes capacitor 138.

During the initial portion of the period when capacitor 138 is charging, several charge paths could include timers 118, 120, 122 and 124 as well as Zener diode 128 and the gate/cathode of SCR 116, which could result in serious damage to the timers, diode and SCR. To preclude development of such damaging charge paths, a diode 156 is connected as illustrated in FIG. 2 thereby avoiding any damage to the components.

The graph of FIG. 4 illustrates that a single level of current is used to charge battery B and that, for the first 9.1 minutes the single level of current is supplied at a 75% duty cycle, for the next 3.64 hours the single level of current is supplied at a 100% duty cycle and for the remainder of the charging cycle the single level of current is supplied at a 12.5% duty cycle.

In summary, chargers 10 and 100 each utilize a timer system in conjunction with a single predetermined level current source wherein the charger operates in multiple periods and under a different duty cycle for each level.

The above-described embodiments, of course, are not to be construed as limiting the breadth of the present invention. Modifications, and other alternative constructions, will be apparent which are within the spirit and scope of the invention as defined in the appended claims.

What is claimed is:

1. A timed battery charger for processing a battery through a charging cycle, which comprises:
    a current source for providing current at a single predetermined level at all times during the charging cycle;
    means for dividing the charging cycle into a plurality of prescribed timed periods during each of which the current at the single predetermined level is available to be supplied to the battery for charging of the battery;
    means for establishing a prescribed duty cycle of operation for each of the plurality of prescribed timed periods; and
    means for facilitating the supply of current from the current source at the single predetermined level in accordance with the duty cycle of operation for each of the plurality of prescribed timed periods.

2. The timed battery charger as set forth in claim 1, wherein the current source includes:
    a capacitor connectable on one side thereof to an AC power source for developing a constant current source; and
    a rectifier connected to the other side of the capacitor for rectifying the output of the capacitor to provide the current at the single predetermined level.

3. The timed battery charger as set forth in claim 1, wherein the dividing means includes at least one timer which establishes a first period at which the single level current is supplied to the battery and initiates at least a second period at which the single level current is supplied to the battery.

4. The timed battery charger as set forth in claim 1 wherein the establishing means includes a least one timer which is operable to establish the duty cycle of operation for each of the plurality of periods.

5. The timed battery charger as set forth in claim 1, wherein the facilitating means includes a switching element connected in a charging current path which is responsive to the establishing means to facilitate the supplying of the single-level current in accordance with the duty cycles of each of the periods.

6. The timed battery charger as set forth in claim 1, wherein the current source includes:
    a transformer having a primary and a secondary with the primary being connectable to an AC input power source, and
    a rectifier connected to the secondary of the transformer for rectifying the current at the secondary to provide the current at the single level.

7. The timed battery charger as set forth in claim 1, wherein the current source includes:
    a capacitor connectable on one side thereof to an AC power source, and
    a switching element connected in a current path which includes the capacitor and the battery;
    and the timed battery charger further comprises:
    means for allowing the capacitor to charge initially slowly notwithstanding operation of the switching element.

8. The timed battery charger as set forth in claim 1, which further comprises means for preventing the initiation of the operation of the facilitating means during any period when the instantaneous voltage level across the facilitating means is above a prescribed level.

9. The timed battery charger as set forth in claim 8, wherein the facilitating means includes a first switching element connected in a battery-charging current path and the preventing means includes a second switching element which prevents the first switching element from turning on when the instantaneous voltage level across the first switching element is above the prescribed level.

10. A timed battery charger for processing a battery through a charging cycle, which comprises:
    a current source for providing current at a single predetermined level at all times during the charging cycle;
    first controlling means for controlling the current source to supply current to the battery at the single level for a first prescribed charging period;
    first duty cycle means for facilitating the supply of current to the battery at a first prescribed duty cycle during the first prescribed charging period;

second controlling means for controlling the current source to supply current to the battery at the single level for a second prescribed charging period;

second duty cycle means for facilitating the supply of current to the battery at a second prescribed duty cycle during the second prescribed charging period;

third controlling means for controlling the current source to supply current to the battery at the single level for a third prescribed charging period, and third duty cycle means for facilitating the supply of current to the battery at a third prescribed duty cycle during the third prescribed charging period.

11. The timed battery charger as set forth in claim 10 wherein the current source includes a switch which is controlled by the first controlling means, the second controlling means and the third controlling means and through the first duty cycle means, the second duty cycle means and the third duty cycle means, respectively, to facilitate the supply of current at the single level to the battery.

12. The timed battery charger as set forth in claim 10 wherein each of the first prescribed charging period, the second prescribed charging period and the third prescribed charging period is a period different from either period of the remaining two periods.

13. The timed battery charger as set forth in claim 10 wherein each of the first prescribed duty cycle, the second prescribed duty cycle and the third prescribed duty cycle is a duty cycle different from either period of the remaining two duty cycles.

14. A timed battery charger for processing a battery through a charging cycle, which comprises:

means for supplying a charging current at a single level to the battery to be charged;

a first timer for establishing a first charging period during which the charging current at the single level is supplied by the supplying means;

a second timer for controlling operation of the supplying means at a first duty cycle during the first charging period so that the charging current is supplied to the battery at the single level and at the first duty cycle;

a third timer for establishing a second charging period and for controlling operation of the supplying means at a second duty cycle during the second charging period so that the charging current is supplied to the battery at the single level and at the second duty cycle, and a fourth timer for controlling operation of the supplying means at a third duty cycle during a third charging period following completion of the second charging period whereby charging current at the single level is supplied to the battery at the third duty cycle.

15. The timed battery charger as set forth in claim 14 wherein:

operation of the first timer, the second timer and the third timer are initiated simultaneously;

the second timer is controlled to cease operation upon completion of first charging period, and the fourth timer is controlled to initiate operation upon completion of the second charging period.

16. The timed battery charger as set forth in claim 14 wherein the supplying means includes a switch which is controlled during the first charging period, the second charging period and the third charging period to supply the charging current at the single level and at the first duty cycle, the second duty cycle and the third duty cycle, respectively.

17. The timed battery charger as set forth in claim 14 wherein the supplying means includes:

a rectifier, and a transformer having a primary connectable to an AC input source and a secondary connected to the rectifier, the output of which provides the charging current at the single level.

* * * * *